United States Patent [19]

Schubert

[11] Patent Number: 5,667,686
[45] Date of Patent: Sep. 16, 1997

[54] HYDROCYCLONE FOR LIQUID - LIQUID SEPARATION AND METHOD

[75] Inventor: Mark F. Schubert, Houston, Tex.

[73] Assignee: United States Filter Corporation, Palm Desert, Calif.

[21] Appl. No.: 547,250

[22] Filed: Oct. 24, 1995

[51] Int. Cl.$^6$ ................................................. B01P 21/26
[52] U.S. Cl. ................................. 210/512.1; 210/788
[58] Field of Search ........................... 210/512.1, 787, 210/788; 55/459.1, 459.2, 459.3, 459.4, 459.5; 209/715, 725

[56] References Cited

U.S. PATENT DOCUMENTS

| | | |
|---|---|---|
| 2,377,524 | 6/1945 | Samson et al. |
| 2,849,930 | 9/1958 | Freeman et al. |
| 3,471,018 | 10/1969 | Sliepcevich et al. |
| 3,850,816 | 11/1974 | Koch. |
| 4,208,270 | 6/1980 | Grieve et al. |
| 4,237,006 | 12/1980 | Colman et al. |
| 4,251,368 | 2/1981 | Colman et al. |
| 4,389,307 | 6/1983 | Boadway. |
| 4,576,724 | 3/1986 | Colman et al. |
| 4,673,495 | 6/1987 | Carroll et al. |
| 4,722,796 | 2/1988 | Colman et al. |
| 4,737,271 | 4/1988 | Childs. |
| 4,749,490 | 6/1988 | Smyth et al. |
| 4,764,287 | 8/1988 | Colman et al. |
| 4,793,924 | 12/1988 | Colman et al. |
| 4,810,382 | 3/1989 | Colman et al. |
| 4,842,145 | 6/1989 | Broadway. |
| 4,849,107 | 7/1989 | Thew et al. |
| 4,857,197 | 8/1989 | Young et al. |
| 4,964,994 | 10/1990 | Wakley et al. |
| 5,017,288 | 5/1991 | Thew et al. |
| 5,032,275 | 7/1991 | Thew. |
| 5,049,277 | 9/1991 | Kalnins. |
| 5,071,556 | 12/1991 | Kalnins et al. |
| 5,071,557 | 12/1991 | Schubert et al. |
| 5,108,608 | 4/1992 | Carroll. |
| 5,110,471 | 5/1992 | Kalnins. |
| 5,133,861 | 7/1992 | Grieve. |
| 5,225,082 | 7/1993 | Young et al. |

OTHER PUBLICATIONS

Peter G. Michaluk & Ann L. Cassaday, *Recent Advances in Hydrocyclone and Flotation Cell Technology for Produced Water*, Presented at the American Filtration Society Produced Water Seminar (Jan. 21, 1994).

Grant Young et al., *Improved Understanding of Deoiling Hydrocyclones Leads to Significant Performance Improvement*, (Amoco Production Company Research Department –Tulsa Production Research Division, Dec. 23, 1993).

M. F. Schubert, *Advancements in Liquid Hydrocyclone Separation Systems*, Presented at the 24th Annual Offshore Technology Conference in Houston, Texas, OTC 6869 (May 4–7, 1992).

D. A. Colman & M. T. Thew, *Correlation of Separation Results from Light Dispersion Hydrocyclones*, Chemical Engineering Research & Design, vol. 61 (Jul. 1983).

(List continued on next page.)

Primary Examiner—David A. Reifsnyder
Attorney, Agent, or Firm—Akard & Griffin

[57] ABSTRACT

A liquid—liquid separating hydrocyclone that utilizes gradual taper angles to reduce energy loss, helical precession, and velocity differentials and, thereby, increase the efficiency and capacity of the hydrocyclone. A separation portion of the hydrocyclone tapers to the underflow outlet orifice and no cylindrical portion is used at the underflow end. The hydrocyclone has either one or two frustoconical taper sections that have predetermined taper angles. The hydrocyclone cavity conforms to specified relationships that limit the taper and length to provide sufficient retention and to maintain the centrifugal force at the underflow end. The hydrocyclone includes inlets for introduction of a liquid mixture and separate outlets for the less dense liquid and the more dense liquid. An improved method of separating a less dense liquid from a more dense liquid is to functionally apply the above described hydrocyclone.

19 Claims, 2 Drawing Sheets

OTHER PUBLICATIONS

W. K. Price et al., *An Empirical Model for a Hydrocyclone: Reject Rate Versus Orifice Size and Pressure Ratio*, Flow Measurement Instruments, vol. 1 (Oct. 1990).

J. J. Hayes et al., *Hydrocyclones for Treating Oily Water: Development and Field Testing in Bass Strait*, Presented at the 17th Annual Offshore Technology Conference in Houston, Texas, OTC 5079 (May 6–9, 1985).

N. Meldrum, *Hydrocyclones: A Solution to Produced Water Treatment*, Presented at the 19th Annual Offshore Technology Conference in Houston, Texas, OTC 5594 (Apr. 27–30, 1987).

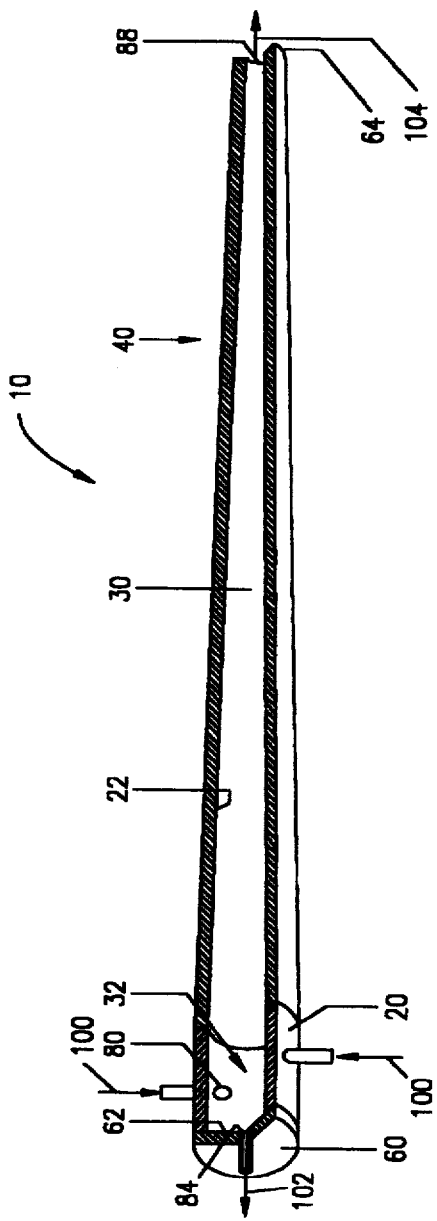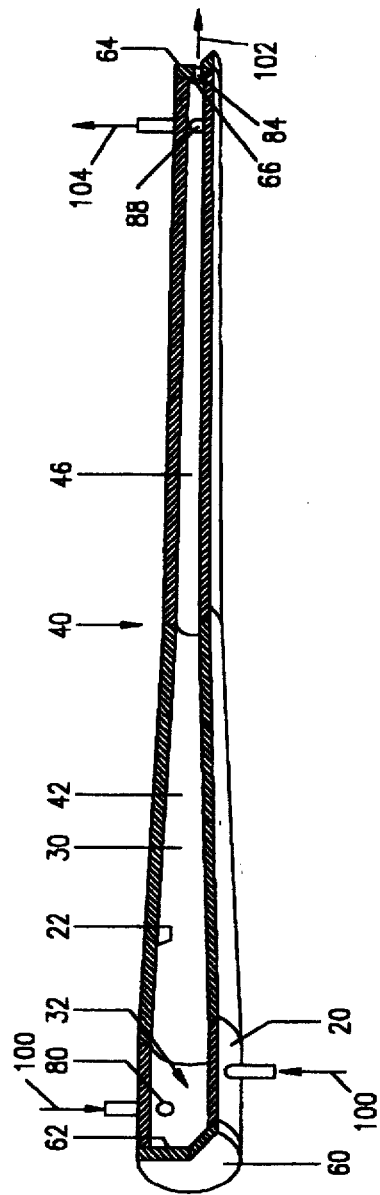

HYDROCYCLONE FOR LIQUID - LIQUID SEPARATION AND METHOD

BACKGROUND OF THE INVENTION

Field of Invention

This invention relates to a hydrocyclone. More specifically, it is directed to a high efficiency hydrocyclone for separation of a lower density liquid from a higher density liquid that utilizes a separation chamber that continually and gradually tapers.

The device is a hydraulically efficient hydrocyclone for separating a fluid mixture with a lighter phase liquid dispersed into a heavier phase liquid. The device is of particular importance in separating relatively low concentrations of lighter liquid from a continuous phase heavier liquid. The separator comprises a separation section with a gradual decrease in cross-sectional area throughout the entire length of the hydrocyclone. The hydrocyclone comprises an inlet area at the major diameter of the separation section and at least one outlet at the smaller diameter of the taper and an overflow outlet located centrally at the major diameter end of the taper.

The present invention relates to the separation of two immiscible liquids of differing densities through the efficient use of centrifugal force generated in a non-rotating chamber. The device has particular relevance to the oil and gas industries where large volumes of oil and water must be separated.

Hydrocyclones have been in use for many years dating back to the 1800's. Hydrocyclones have been adapted for use in separation of solids from liquid, solids from gas and gas from liquid. More recently, hydrocyclones have been applied to the separation of liquids from other liquids.

Studies conducted by Bradley in 1950's dealt primarily with conventional practices of hydrocyclones in solid—liquid applications. Bradley conducted limited studies of the use of hydrocyclones for separation of two liquid phases. He found that the separation of two liquids was much more difficult. This was due in part to the fact that liquid droplets dispersed in another fluid are much more fragile especially in the high shear. environment of hydrocyclones. The high shear stresses fragment the droplets into even smaller particles making them more difficult to separate. Separation is further hindered by the relatively low density differences between the fluids as compared to separation of solids or gasses which have relatively high density differences.

Later work by Listewnick and Regher also attempted to apply cyclones to liquid—liquid separation but had only limited success.

In the late 1970's, Professor Martin Thew conducted an in depth study of liquid—liquid separation using hydrocyclones. He found that using a series of cylindrical and tapering sections in combination substantially improved separation. These findings are described in U.S. Pat. No. 4,237,006, Colman et al. and further refined in U.S. Pat. Nos. 4,576,724 and 4,722,796 by Derek Colman and Martin Thew.

Further studies in the mid 1980's showed that the use of curved wall geometries as described in U.S. Pat. No. 4,949,107 could further increase separation efficiency by reducing shear and flow stagnation. The geometries described in this patent suggests the use of an exponential equation to define the shape of the separation chamber. The particular shapes mentioned allow for a rapid reduction in cross section of the separating chamber at the inlet end of the cyclone.

Work was also conducted in the use of complex involute entry paths to the hydrocyclone in order to provide a more gradual inlet to the hydrocyclone. Although this technique was well known in its application of solid—liquid hydrocyclones, it was further studied and patented by Prendergast for liquid—liquid hydrocyclones in U.S. Pat. No. 4,710,299.

Additionally, U.S. Pat. No. 4,764,287 by Colman and Thew describe the use of a single inlet in the form of "an inward spiralling feed channel which may be involute in form." Though a single inlet is functional, using only a single inlet contributes to an unstable helical flow path within the vortex. Two or more evenly spaced entries provide a more stable central core.

Additional study by Kalnins and Mai in U.S. Pat. No. 5,071,556 indicates that smaller diameter hydrocyclones with a more rapid acceleration of the fluids in the inlet section followed by a longer separation section could provide the best overall efficiency. It is believed that the improvement in efficiency obtained by this work was more a function of the reduction in hydrocyclone diameter than by the shorter inlet accelerating section. Further, it is well known by those skilled in the art that a smaller diameter provides better separation due to the greater centrifugal forces obtained and due to the shorter distances that the particles must travel across the cyclone diameter. This effect is also well known from the classification of solids separation using hydrocyclones where a smaller diameter provides a lower cut size of particles.

In all of the above described references, the inventions describe hydrocyclones of complex geometric shapes as well as multiple taper and curved sections to achieve the desired performance. These complex shapes are costly to manufacture and require exact measurements.

More importantly, these complex shapes and transition points create several significant problems. First, the transition between various angles creates instability of the flow field and an increase in the energy loss of the flow. Secondly, the sharp reduction in area creates a much greater energy loss due to higher differential velocities between the fluid layers. Third, the rapid acceleration of fluids can cause Very high internal shear stresses leading to droplet breakup. These concepts are described in more detail below.

Fluid is introduced tangentially into the hydrocyclone at a relatively high velocity. The higher velocity outer fluid layers contact the lower velocity inner fluid layers and exert a torque thereon causing the inner fluid layers to rotate. Thus, the outer fluid layers have a relatively higher velocity than the inner fluid layers. However, the velocity differentials between the fluid layers cause energy loss in the flow field. This energy loss is caused, in part, by the transfer of fluid between fluid layers (i.e. radial flow of fluid), localized turbulent flow created by the velocity differentials, as well as other velocity transfer inefficiencies between the fluid layers.

The energy loss in the flow field is exacerbated at the angular transition areas between different taper sections. The greater the change in taper angle between the taper sections, the greater the change in rotational velocity of the fluid. In this area of velocity transition, the increased turbulence in the flow field and the increased transfer of fluid between fluid layers increases the energy loss in the fluid and creates a wave in the fluid core making removal of the core difficult and, thereby, reduces the capacity of the hydrocyclone. This wave in the core effects the minimum overflow flow rate and increases the minimum inlet flow rate required for efficient operation.

In addition, the flow in the hydrocyclone is subject to a helical precession effect. Precession is a complex motion executed by a rotating body subjected to a torque tending to change its axis of rotation. In a hydrocyclone, as the fluid enters tangentially, it applies a torque to the fluid in the hydrocyclone and creates a spiral, or cork screw, flow following a helical path. The spiral flow and the change in the axis of rotation produces an oscillating effect on the central core of lower density liquid. Helical precession intensifies in areas of transition from one taper angle to another taper angle. In these areas of elevated precession, the oscillation amplitude of the central core is magnified and creates an increased wave effect in the fluid core making removal of the core difficult and, thereby, reduces the capacity of the hydrocyclone. Detrimental helical precession is also seen and further intensified in hydrocyclones having a single inlet.

Reducing the area through which a fluid passes increases the energy loss of those fluids due, in part, to acceleration of the fluid. This acceleration results in higher velocity differentials between fluid layers. The high velocity of the inlet fluid is achieved by providing a relatively high pressure, high velocity fluid in the inlet fluid supply line. However, as the fluid in the hydrocyclone loses energy, it also loses velocity. Because the hydrocyclone depends upon centrifugal force for its operation, maintenance of a relatively high fluid velocity is crucial.

Often, hydrocyclones utilize rapid transitions in cross sectional area to accelerate the fluids. This type of fluid acceleration, however, requires much higher inlet pressures to maintain a given flow rate due to the increased energy loss. Because the inlet fluid necessarily enters the hydrocyclone at a higher relative velocity than the fluid in the hydrocyclone, providing higher inlet pressure and velocity also creates a greater loss of fluid energy at the inlet of the hydrocyclone.

Centrifugal force is a function of velocity and radius of the flow wherein:

Centrifugal Force $\alpha$ (Velocity)$^2$/Radius

Therefore, the higher the velocity or the smaller the radius, the higher the centrifugal forces. Typical hydrocyclones use steep taper angles to accelerate the flow at the inlet end of the hydrocyclone. This generates high velocity at the inlet, but increases the energy loss of the fluid. The fluid energy loss leads to a loss in fluid rotational velocity at the outlet end of the hydrocyclone. Thus, at the smaller diameter outlet end of the hydrocyclone, the centrifugal forces are greatly reduced. Maintaining fluid velocity and, thus, centrifugal force, at the underflow end of the hydrocyclone is of critical importance because only in this area of the hydrocyclone can the smaller liquid droplets be separated. These smaller droplets require strong centrifugal forces and short migration distances in order to effectively separate from the higher density liquid.

Generally, liquid—liquid separating hydrocyclones include a cylindrical portion at the underflow end. The cylindrical portion provides an increased retention time to allow additional time for the lower density liquid droplets to migrate to the core. Inclusion of the cylindrical portion facilitates greater separation. However, because this portion of the hydrocyclone is cylindrical, the fluid loses velocity and centrifugal force. Therefore, the amount of increased separation due to the additional retention time is relatively small; and the separation in the cylindrical portion is relatively inefficient.

Lastly, the rapid acceleration of the fluids created by reduction in area as described in the prior art can create area of high shear stress. As the fluid experiences turbulence and shear stress, dispersed lower density liquid droplets that encounter these shear zones are literally torn apart creating many smaller droplets. The smaller droplets are more difficult to separate as they are less buoyant than larger droplets due to the smaller volume each small droplet occupies.

2. Related Art

Hydrocyclones have long been known in the prior art and the prolixity of prior references is widespread. Although solid—liquid hydrocyclones are shown in prior patents as early as the nineteenth century, hydrocyclones were not functionally applied to liquid—liquid separation until the late 1970's.

Illustrative of such liquid—liquid hydrocyclones are U.S. Pat. Nos. 4,237,006, 4,576,724, 4,722,796, 5,071,556, and 4,964,994.

Though prior liquid—liquid hydrocyclones are helpful in separating a lower density liquid from a higher density liquid, they can be improved to provide less fluid energy loss and higher capacity separation at a lower cost of manufacturing the hydrocyclone.

SUMMARY OF THE INVENTION

Accordingly, the objectives of this invention are to provide, inter alia, a hydrocyclone for liquid—liquid separation and method that:

provides greater separation capacity;

reduces the energy loss in the hydrocyclone;

reduces the number of taper transitions, thereby, lowering the cost of manufacture;

provides an improvement over the relatively inefficient cylindrical portion at the underflow end;

utilizes low taper angles to facilitate higher centrifugal forces at the underflow end;

increases the flow capacity due to reduced energy loss; improves the separation efficiency; and reduces the shear forces of the fluid layers and, thus, minimizes fluid droplet breakup.

Other objects of the invention will become apparent from time to time throughout the specification and claims as hereinafter related.

To achieve such improvements, my invention is a high efficiency hydrocyclone for separation of a lower density liquid from a higher density liquid. The hydrocyclone has a hydrocyclone body with a wall that defines a cavity therein. The cavity has an overflow end, an underflow end, and an axis that extends between these two ends. The cross section of the cavity is circular throughout its axial length. A portion of the cavity that is proximal the overflow end, the inlet chamber portion, is in flow communication with at least one inlet that extends through the hydrocyclone wall. The separation portion of the cavity extends from the inlet chamber portion to the underflow end. The inlet orifices are positioned and constructed to communicate a liquid mixture into the inlet chamber portion in a direction that is substantially tangential to the hydrocyclone body wall. In this way, the introduced liquid mixture creates a swirling vortex within the cavity. The cross sectional area of the separation portion continuously decreases toward the underflow end. This gradual decrease in diameter increases the centrifugal forces imparted upon the liquid mixture to facilitate separation of the liquids having different densities. An overflow orifice provides evacuation of the less dense liquid; and the underflow orifice provides evacuation of the more dense liquid.

Functionally applying the above described hydrocyclone provides an improved method of separating a higher density liquid from a lower density liquid.

BRIEF DESCRIPTION OF THE DRAWING

The manner in which these objectives and other desirable characteristics can be obtained is explained in the following description and attached drawings in which:

FIG. 1 is a partial cross sectional isometric view of a hydrocyclone having a single taper.

FIG. 2 is a partial cross sectional isometric view of a hydrocyclone having two tapers, the underflow orifice extending through the hydrocyclone body wall, and the overflow orifice is a passageway through the underflow end wall.

DETAILED DESCRIPTION OF THE INVENTION

Figure 3:
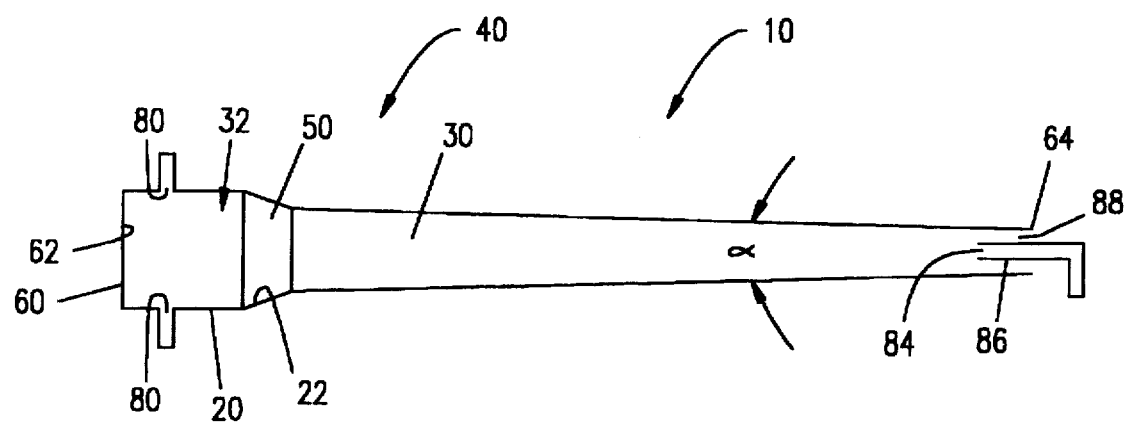
FIG. 3 is a schematic drawing of the hydrocyclone having a transition portion and a single taper as well as an overflow orifice positioned at the underflow end and including a vortex finder.
Figure 4:
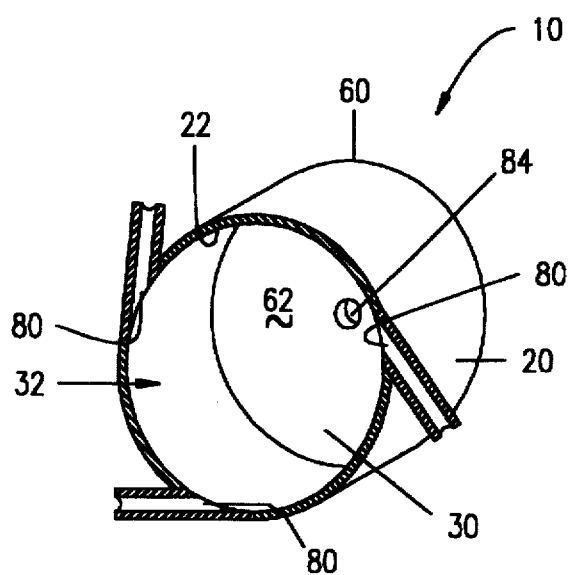
FIG. 4 is a partial cross sectional orthographic view of the inlet cheer portion having three inlet orifices and a vortex finder on the overflow outlet.

The preferred embodiment of my invention is illustrated in FIGS. 1 through 4 and the hydrocyclone is depicted as 10. Generally, the hydrocyclone 10 has a hydrocyclone body 20 with a hydrocyclone body wall 22 that defines a hydrocyclone cavity 30.

The construction of the hydrocyclone cavity 30 is such that it decreases in cross sectional area from its overflow end 60 to its underflow end 64. When a liquid mixture 100 enters the large diameter end tangentially to the hydrocyclone cavity 30, the liquid creates a swirling vortex within the hydrocyclone cavity 30. As the liquid mixture 100 spins toward the smaller underflow end 64, the centrifugal forces within the fluid increase and, thereby, separate the less dense liquid 102 from the more dense liquid 104.

As mentioned, the hydrocyclone body 20 has a hydrocyclone body wall 22. The hydrocyclone body wall 22 may be relatively thin and substantially uniform in thickness. In which case, the outer shape of the hydrocyclone body 20 is substantially similar to the shape of the hydrocyclone cavity 30.

An axis extends longitudinally through the hydrocyclone cavity 30 from the underflow end 64 to the overflow end 60. Preferably, the hydrocyclone cavity 30 has a substantially circular cross section throughout its axial length.

The hydrocyclone cavity 30 has an inlet chamber portion 32 proximal the overflow end 64 and a separation portion 34 that extends from the inlet chamber portion 32 to the underflow end 60. The inlet chamber portion 32 preferably has a substantially constant diameter throughout its axial length which results in a cylindrical shape. However, a slight taper in the inlet chamber portion 32 would have little effect on performance and may be used. Preferably, the inlet chamber portion 32 terminates at an overflow end wall 62 at the overflow end 60. Typically, the inlet chamber portion 32 has a substantially shorter axial length than the separation portion At least one inlet orifice 80 in the hydrocyclone body wall 22 provides flow communication with the inlet chamber portion and facilitates the introduction of a liquid mixture 100 therein. To create the swirling vortex of liquid mixture 100, the inlet orifices 80 are constructed and positioned to direct the fluid mixture 100 into the inlet chamber portion 32 in a direction that is tangential to the hydrocyclone body wall 22. In this way, the force and energy of the fluid mixture 100 is directed along the hydrocyclone body wall 22 and follows its shape. Because the hydrocyclone body wall 22 is circular, the fluid mixture spins in the hydrocyclone cavity 30 and creates the spinning vortex. Typically, the hydrocyclone 10 includes at least two inlet orifices 80 that are equally spaced about the circumference of the hydrocyclone cavity 30. Preferably, the number of inlet orifices 80 is two (2) or three (3) (see FIGS. 1 and 4).

Outlet orifices, 84 and 88, provide for removal of the separated liquids, 102 and 104. The underflow orifice 88 is positioned and constructed to provide for evacuation of the more dense liquid 104. The underflow orifice 88 is formed by the intersection of the hydrocyclone cavity 30 and the underflow end 64. In other words, the hydrocyclone body 20 terminates at the underflow end 64 leaving the hydrocyclone cavity 30 open and, thereby, forming the underflow orifice 88 at the underflow end 64. Because the cross section of the hydrocyclone cavity 30 is preferably circular, the underflow orifice 88 is also preferably circular and is concentric therewith. The underflow orifice 88 may alternatively be located in the hydrocyclone body wall 22 (see FIG. 2); and the hydrocyclone 10 may include more than one underflow orifice 88. Typically, with the underflow orifice 88 positioned in the hydrocyclone body wall 22, the underflow orifices 88 are substantially tangential to the hydrocyclone body wall 22.

Likewise, the overflow orifice 84 is positioned and constructed to provide for evacuation of the less dense liquid 102. Because the centrifugal force of the swirling vortex forces the more dense liquid 104 toward the hydrocyclone body wall 22 and the less dense liquid 102 toward the axis of the hydrocyclone cavity 30, the overflow orifice is concentric, axially aligned, with the hydrocyclone cavity 30. The overflow orifice 84 may provide evacuation from either the overflow end 60 or the underflow end 64.

In one embodiment, the overflow orifice 84 simply comprises a passageway through the overflow end wall 62 (see FIG. 1). As the less dense liquid 102 moves toward the center of the hydrocyclone cavity 30, it forms a core that flows toward the overflow end 60. As additional liquid mixture 100 enters the hydrocyclone 10, the less dense liquid 102 exits the hydrocyclone 10 through the overflow orifice 84.

In another embodiment, the overflow orifice 84 is positioned at the underflow end 64. Typically, with the overflow orifice 84 positioned at the underflow end 64, either (1) the overflow orifice includes a vortex finder 86 (see FIG. 3) or (2) the hydrocyclone 10 includes a underflow end wall 66 and the underflow orifice 88 is positioned in the hydrocyclone body wall 22 (see FIG. 2). In the later design, the overflow orifice 84 generally comprises a passageway through the underflow-end wall 66.

The separation portion 40 has a cross sectional area that continuously decreases toward the underflow end 64. At the end of the separation portion 40 adjacent the inlet chamber portion 32, the separation portion 40 has a diameter substantially equal to the diameter of the inlet chamber portion 32. Thus, at the end of the separation portion 40 adjacent the inlet chamber portion 32, the separation portion 40 diameter is greatest. The separation portion 40 diameter gradually and continually decreases to the underflow end 64. Preferably, the separation portion 40 includes at least one taper portion having a linear decrease in diameter.

Because the diameter of the separation portion 40 decreases, as the spinning fluid mixture 100 progresses toward the underflow end 64, the centrifugal forces imparted on the fluid mixture 100 increase. The centrifugal force causes the more dense liquid 104 toward the hydrocyclone body wall 22 which, in turn, forces the less dense liquid 102 toward the axis of the hydrocyclone cavity 30. Consequently, the liquid mixture 100 separates into the less dense liquid 102 and the more dense liquid 104.

As used herein, the "included taper angle" refers to the total taper angle of the separation portion or the angle of convergence of the hydrocyclone body walls 22 toward one another. The included taper angle is shown in FIG. 3 as $\alpha$. FIG. 3 shows a side cross sectional view of the hydrocyclone 10 taken through its central axis. The included taper angle is the angle formed between opposite converging walls. Likewise, the half taper angle is the taper angle as measured between the hydrocyclone body wall 22 and the central axis. Thus, as the name suggests, the half taper angle is exactly half the included taper angle.

In a first preferred embodiment, the decrease of the diameter of the separation portion 40 is linear. Thus, the separation portion 40 is a single frustoconical tapered section that has a single taper angle throughout its length (see FIG. 1). Preferably, the included taper angle is between 1° and 3° (i.e. the half taper angle is between 0.5° and 1.5°); and is most preferably between 1° and 2° (i.e. the half taper angle is between 0.5° and 1°). Further, the preferred single taper design conforms to the following geometric relationships:

$D_u/D_i \leq 0.8$
$18 \leq L_s/D_i \leq 50$ where $D_i$ is the internal diameter at the overflow end 60, $D_u$ is the internal diameter at the underflow end 64, and $L_s$ is the axial length of the separation portion 40. However, the most preferred single taper design conforms to the following geometric relationships:

$0.2 \leq D_u/D_i \leq 0.6$
$18 \leq L_s/D_i \leq 40$

With the foregoing geometric limitations, the hydrocyclone cavity 30 is assured of having a gradual, consistent transition from the inlet chamber portion 32 to the underflow end 64. Thus, the flow is not subjected to changes in tapers or rapid acceleration that, as previously discussed, tend to increase differential velocities, velocity transitions, and helical precession between the fluid layers and, thereby, increase energy loss. Thus, with the gradual taper design of the present invention, the loss of fluid energy and velocity is minimized as is the wave effect associated with the taper transitions. Consequently, the centrifugal forces remain high, particularly at the underflow end 64, and the capacity of the hydrocyclone 10 is increased.

Further, because the taper is sufficiently gradual and the separation portion 40 is relatively long, the hydrocyclone 10 has no need for a generally cylindrical portion at the underflow end 64. Providing a taper throughout the length of the separation portion 40, maintains the velocity and centrifugal force of the liquid mixture 100 and provides for more efficient separation of the less dense fluid 102 droplets at the underflow end 64. Also, the relatively long separation portion 40 provides sufficient retention time for droplet migration and separation.

These principles of gradual taper and a relatively long separation portion 40, along with their associated consequences, described above, apply to the second preferred embodiment that includes two taper sections, 42 and 46 (see FIG. 2). In this embodiment, the separation portion 40 includes a first taper section 42 and a second taper section 46. The first taper section 42 is proximal the inlet chamber portion 32 and is adjacent to the second taper section 46. The second taper section 46 is adjacent the underflow end 64. Both the first taper section 42 and the second taper section 46 are substantially frustoconical in shape and have a linear decrease in diameter. Likewise, the first taper section 42 and the second taper section 46 each have a predetermined taper angle. Preferably, the first taper section taper angle is greater than the second taper section taper angle. Thus, the taper of the separation portion 40 is made more gradual toward the underflow end 64. Because the taper angles of both the first taper section 42 and the second taper section 46 are relatively small, the change in taper angle is relatively small. Therefore, the consequences of the change in fluid velocity and the precession effect at the taper transition are relatively small.

Preferably, the included taper angle of the first taper section 42 is between 2° and 6° (i.e. the half taper angle is between 1° and 3°); and is most preferably between 3° and 5° (i.e. the half taper angle is between 1.5° and 2.5°). The preferred included taper angle of the second taper section is between 0.6° and 2° (i.e. the half taper angle is between 0.3° and 1°); and is most preferably between 0.6° and 1° (i.e. the half taper angle is between 0.3° and 0.5°). Further, the preferred two taper design conforms to the following geometric relationships:

$D_s/D_i \leq 0.8$
$18 \leq L_s/D_i \leq 50$
$0.15 \leq D_u/D_i \leq 0.65$ where $D_i$ is the internal diameter at the overflow end 60, $D_u$ is the internal diameter at the underflow end 64, $D_s$ is the internal diameter at the intersection of the first taper section 42 and the second taper section 46, and $L_s$ is the axial length of the separation portion 40. However, the most preferred geometric relationships for the two taper design are:

$0.3 \leq D_s/D_i \leq 0.6$
$18 \leq L_s/D_i \leq 40$
$0.15 \leq D_u/D_i \leq 0.4$
$D_i \geq 28$ mm
$L_s < 10 \, D_i$
$L_s = L_s + L_u$ where $L_s$ is the axial length of the first taper section 42 and $L_u$ is the axial length of the second taper section 46.

The above geometric limitations provide the gradual taper construction sought and achieved by the present invention.

Although steep taper angles cause significant energy loss, some degree of limited initial acceleration of the fluid mixture 100 has proven beneficial. In the present invention, the separation portion 40 may include a transition portion 50 adjacent to the inlet chamber portion 32 (see FIG. 3). Like the other tapers of the separation portion 40 the transition portion 50 preferably has a linear decrease in diameter and a frustoconical shape. However, to reduce the ill effects of rapid acceleration and extreme taper angle changes, the transition portion taper angle is less than a 90° included taper angle (i.e. a 45° half angle). Preferably, the transition portion taper angle has a 40° included taper angle (i.e. a 20° half angle). Further, the decrease of cross sectional area in the transition portion is less than 40% of the inlet chamber diameter 32. In this way, the helical precession and energy loss, as well as the resulting shear forces and velocity differentials, is reduced because the acceleration is limited.

A method of improved separation of a less dense liquid 102 from a more dense liquid 104 is to functionally apply the above described hydrocyclone 10. Application of this hydrocyclone 10 simply comprises introducing a liquid mixture 100 into the hydrocyclone 10.

I claim:

1. A high efficiency hydrocyclone for separation of a lower density liquid from a higher density liquid comprising:

a hydrocyclone body having a hydrocyclone body wall;

an elongated hydrocyclone cavity defined by said hydrocyclone body wall;

said hydrocyclone cavity having an overflow end, an underflow end, and a substantially centrally located axis extending between said underflow end and said overflow end;

said hydrocyclone cavity having a substantially circular cross section throughout its axial length;

said hydrocyclone cavity further having an inlet chamber portion proximal said overflow end and a separation portion extending from said inlet chamber portion to said underflow end;

at least one inlet orifice in said hydrocyclone body wall in flow communication with said inlet chamber portion of said hydrocyclone cavity;

said at least one inlet orifice positioned and constructed to communicate a liquid mixture into said inlet chamber portion in a direction that is tangential to said hydrocyclone body wall;

thereby said introduced liquid mixture creates a swirling vortex flow path in said hydrocyclone cavity;

said separation portion having a diameter that continuously decreases towards said underflow end;

the decrease of said diameter of said separation portion is linear;

whereby said separation portion is frustoconical;

said separation portion has an included taper angle between 1° and 2°;

so that said separation portion gradually decreases in diameter, thereby, increasing the centrifugal forces imparted on said liquid mixture in order to facilitate separation of a less dense liquid of said liquid mixture from a more dense liquid;

whereby the gradual decrease in said separation portion diameter further promotes conservation of fluid momentum and separation toward said underflow end;

an overflow orifice positioned and constructed to provide for evacuation of said less dense liquid;

at least one underflow orifice proximal said underflow end positioned and constructed to provide for evacuation of said more dense liquid;

said hydrocyclone cavity terminating at said underflow end; and whereby no additional separation occurs within said hydrocyclone beyond said underflow end.

2. A high efficiency hydrocyclone for separation of a lower density liquid from a higher density liquid as claimed in claim 1 wherein:

said separation portion having at least two taper sections;

said at least two taper sections each having a linear decrease of said diameter; and whereby said at least two taper sections are each frustoconical.

3. A high efficiency hydrocyclone for separation of a lower density liquid from a higher density liquid as claimed in claim 1 wherein said hydrocyclone having:

at least two inlet orifices; and said at least two inlet orifices equally spaced about a circumference of said hydrocyclone cavity.

4. A high efficiency hydrocyclone for separation of a lower density liquid from a higher density liquid as claimed in claim 3 wherein the number of said at least two inlet orifices is two.

5. A high efficiency hydrocyclone for separation of a lower density liquid from a higher density liquid as claimed in claim 3 wherein the number of said at least two inlet orifices is three.

6. A high efficiency hydrocyclone for separation of a lower density liquid from a higher density liquid as claimed in claim 1 wherein said overflow orifice is axially aligned proximal said overflow end.

7. A high efficiency hydrocyclone for separation of a lower density liquid from a higher density liquid as claimed in claim 1 wherein said overflow orifice is axially aligned proximal said underflow end.

8. A high efficiency hydrocyclone for separation of a lower density liquid from a higher density liquid as claimed in claim 1 wherein said separation section having an transition portion adjacent said inlet chamber portion.

9. A high efficiency hydrocyclone for separation of a lower density liquid from a higher density liquid as claimed in claim 8 wherein:

said transition portion having a linear decrease of said diameter;

said linear decrease occurring at a predetermined transition portion taper angle; and said transition portion taper angle less than 90°.

10. A high efficiency hydrocyclone for separation of a lower density liquid from a higher density liquid as claimed in claim 9 wherein said transition portion taper angle is 40°.

11. A high efficiency hydrocyclone for separation of a lower density liquid from a higher density liquid as claimed in claim 8 wherein said cross sectional area decreasing less than 40% in said transition portion.

12. An method of separating a lower density liquid from a higher density liquid comprising functionally applying a hydrocyclone as claimed in claim 1.

13. A high efficiency hydrocyclone for separation of a lower density liquid from a higher density liquid comprising:

a hydrocyclone body having a hydrocyclone body wall;

an elongated hydrocyclone cavity defined by said hydrocyclone body wall;

said hydrocyclone cavity having an overflow end, an underflow end, and a substantially centrally located axis extending between said underflow end and said overflow end;

said hydrocyclone cavity having a substantially circular cross section throughout its axial length;

said hydrocyclone cavity further having an inlet chamber portion proximal said overflow end and a separation portion extending from said inlet chamber portion to said underflow end;

at least one inlet orifice in said hydrocyclone body wall in flow communication with said inlet chamber portion of said hydrocyclone cavity;

said at least one inlet orifice positioned and constructed to communicate a liquid mixture into said inlet chamber portion in a direction that is tangential to said hydrocyclone body wall;

thereby said introduced liquid mixture creates a swirling vortex flow path in said hydrocyclone cavity;

said separation portion having a diameter that continuously decreases towards said underflow end;

the decrease of said diameter of said separation portion is linear;

whereby said separation portion is frustoconical;

said separation portion has an included taper angle between 1° and 3°;

so that said separation portion gradually decreases in diameter, thereby, increasing the centrifugal forces imparted on said liquid mixture in order to facilitate separation of a less dense liquid of said liquid mixture from a more dense liquid;

whereby the gradual decrease in said separation portion diameter further promotes conservation of fluid momentum and separation toward said underflow end;

an overflow orifice positioned and constructed to provide for evacuation of said less dense liquid;

at least one underflow orifice proximal said underflow end positioned and constructed to provide for evacuation of said more dense liquid;

said hydrocyclone cavity terminating at said underflow end; and whereby no additional separation occurs within said hydrocyclone beyond said underflow end;

said hydrocyclone cavity has a geometry according to the following relationships:

$D_u/D_i < 0.4$ $25 < L_t/D_i \leq 50$ where $D_i$ is the internal diameter at said overflow end, $D_u$ is the internal diameter at said underflow end, and $L_t$ is the axial length of said separation portion.

14. A high efficiency hydrocyclone for separation of a lower density liquid from a higher density liquid as claimed in claim 13 wherein:

said separation portion has an taper angle between 1° and 2°; and said hydrocyclone cavity has a geometry according to the following relationships:

$0.2 \leq D_u/D_i [\leq 0.6] < 0.4$ $[18 \leq] 25 < L_t/D_i \leq 40$.

15. A high efficiency hydrocyclone for separation of a lower density liquid from a higher density liquid comprising:

a hydrocyclone body having a hydrocyclone body wall;

an elongated hydrocyclone cavity defined by said hydrocyclone body wall;

said hydrocyclone cavity having an overflow end, an underflow end, and a substantially centrally located axis extending between said underflow end and said overflow end;

said hydrocyclone cavity having a substantially circular cross section throughout its axial length;

said hydrocyclone cavity further having an inlet chamber portion proximal said overflow end and a separation portion extending from said inlet chamber portion to said underflow end;

at least one inlet orifice in said hydrocyclone body wall in flow communication with said inlet chamber portion of said hydrocyclone cavity;

said at least one inlet orifice positioned and constructed to communicate a liquid mixture into said inlet chamber portion in a direction that is tangential to said hydrocyclone body wall;

thereby said introduced liquid mixture creates a swirling vortex flow path in said hydrocyclone cavity;

said separation portion having a cross sectional area that continuously decreases towards said underflow end;

so that said separation portion gradually decreases in diameter, thereby, increasing the centrifugal forces imparted on said liquid mixture in order to facilitate separation of a less dense liquid of said liquid mixture from a more dense liquid;

whereby the gradual decrease in said separation portion diameter further promotes conservation of fluid momentum and separation toward said underflow end;

an overflow orifice positioned and constructed to provide for evacuation of said less dense liquid;

at least one underflow orifice proximal said underflow end positioned and constructed to provide for evacuation of said more dense liquid;

said hydrocyclone cavity terminating at said underflow end;

whereby no additional separation occurs within said hydrocyclone beyond said underflow end;

said separation portion having a first taper section and a second taper section;

said first taper section adjacent said second taper section;

said first taper section and said second taper section having a linear decrease of said diameter;

whereby said first taper section and said second taper section are frustoconical;

said first taper section proximal said inlet chamber portion;

said second taper section adjacent said underflow end;

said first taper section having a predetermined first taper section taper angle;

said second taper section having a predetermined second taper section taper angle; and said first taper section taper angle is greater than said second taper section taper angle.

16. A high efficiency hydrocyclone for separation of a lower density liquid from a higher density liquid as claimed in claim 15 wherein:

said first taper section taper angle is between 2° and 6°; and said second taper section taper angle is between 0.6° and 2°.

17. A high efficiency hydrocyclone for separation of a lower density liquid from a higher density liquid as claimed in claim 16 wherein said hydrocyclone cavity has a geometry according to the following relationships:

$D_u/D_i < 0.8$ $18 \leq L_t/D_i < 50$ $0.15 \leq D_u/D_i < 0.65$ where $D_i$ is the internal diameter at said overflow end, $D_u$ is the internal diameter at said underflow end, $D_s$ is the internal diameter at the intersection of said first taper section and said second taper section, and $L_t$ is the axial length of said separation portion.

18. A high efficiency hydrocyclone for separation of a lower density liquid from a higher density liquid as claimed in claim 17 wherein:

said first taper section taper angle is between 3' and 5°; and said second taper section taper angle is between 0.6° and 1°; and said hydrocyclone cavity has a geometry according to the following relationships:

$0.3 < D_s/D_i < 0.6$ $18 < L_t/D_i < 40$ $0.15 < D_u/D_i \leq 0.4$ $L_s < 10\ D_i$ $L_t = L_s + L_u$ where $L_s$ is the axial length of said first taper section and $L_u$ is the axial length of said second taper section.

19. A high efficiency hydrocyclone for separation of a lower density liquid from a higher density liquid as claimed in claim 18 wherein the internal diameter at said overflow end, $D_i$, is greater than 28 mm.

* * * * *

UNITED STATES PATENT AND TRADEMARK OFFICE
CERTIFICATE OF CORRECTION

PATENT NO. : 5,667,686

DATED : September 16, 1997

INVENTOR(S) : Mark F. Schubert

It is certified that error appears in the above-identified patent and that said Letters Patent is hereby corrected as shown below:

Claim 14, Column 11, line 32, "$0.2 \leq D_u D_i [\leq 0.6] < 0.4$" should read -- $0.2 \leq D_u/D_i [\leq 0.6] \leq 0.4$ --.
Claim 14, Column 11, line 33, "$[18 \leq]25 < L_t/D_i \leq 40$" should read -- $[18 \leq] 25 \leq L_t/D_i \leq 40$ --.
Claim 17, Column 12, line 38, "$D_s/D_i < 0.8$" should read -- $D_s/D_i \leq 0.8$ --.
Claim 17, Column 12, line 39, "$18 \leq L_t/D_i < 50$" should read -- $18 \leq L_t/D_i \leq 50$ --.
Claim 17, Column 12, line 40, "$0.15 \leq D_u/D_i < 0.65$" should read -- $0.15 \leq D_u/D_i \leq 0.65$ --.
Claim 18, Column 12, line 49, "between 3'" should read -- between 3° --.
Claim 18, Column 12, line 55, "$0.3 < D_s/D_i < 0.6$" should read -- $0.3 \leq D_s/D_i \leq 0.6$ --.
Claim 18, Column 12, line 56, "$18 < L_t/D_i < 40$" should read -- $18 \leq L_t/D_i \leq 40$ --.
Claim 18, Column 12, line 57, "$0.15 < D_u/D_i \leq 0.4$" should read -- $0.15 \leq D_u/D_i \leq 0.4$ --.

Signed and Sealed this

Thirteenth Day of January, 1998

BRUCE LEHMAN

Attest:

Attesting Officer

Commissioner of Patents and Trademarks

UNITED STATES PATENT AND TRADEMARK OFFICE
CERTIFICATE OF CORRECTION

PATENT NO. : 5,667,686
DATED : September 16, 1997
INVENTOR(S) : Mark F. Schubert It is certified that error appears in the above-identified patent and that said Letters Patent is hereby corrected as shown below:

Claim 14, Column 11, line 32, "$0.2 \leq D_u D_i [ \leq 0.6] < 0.4$" should read -- $0.2 \leq D_u/D_i < 0.4$ --.
Claim 14, Column 11, line 33, "$[18 \leq ] 25 < L_t/D_i \leq 40$" should read -- $25 < L_t/D_i \leq 40$ --.
Claim 17, Column 12, line 38, "$D_s/D_i < 0.8$" should read -- $D_s/D_i \leq 0.8$ --.
Claim 17, Column 12, line 39, "$18 \leq L_t/D_i < 50$" should read -- $18 \leq L_t/D_i \leq 50$ --.
Claim 17, Column 12, line 40, "$0.15 \leq D_u/D_i < 0.65$" should read -- $0.15 \leq D_u/D_i \leq 0.65$ --.
Claim 18, Column 12, line 49, "between 3'" should read -- between 3° --.
Claim 18, Column 12, line 55, "$0.3 < D_s/D_i < 0.6$" should read -- $0.3 \leq D_s/D_i \leq 0.6$ --.
Claim 18, Column 12, line 56, "$18 < L_t/D_i < 40$" should read -- $18 \leq L_t/D_i \leq 40$ --.
Claim 18, Column 12, line 57, "$0.15 < D_u/D_i \leq 0.4$" should read -- $0.15 \leq D_u/D_i \leq 0.4$ --.

This certificate supercedes certificate of correction issued January 13, 1998

Signed and Sealed this

Twenty-eighth Day of April, 1998

*Attest:*

BRUCE LEHMAN

*Attesting Officer*  *Commissioner of Patents and Trademarks*